United States Patent
Huang

(10) Patent No.: US 9,217,512 B2
(45) Date of Patent: *Dec. 22, 2015

(54) COMBINATION OF A FAUCET HANDLE AND A CONTROL VALVE

(71) Applicant: ALEXANDER YEH INDUSTRY CO., LTD., Lukang Chen, Changhua Hsien (TW)

(72) Inventor: Li-Chen Huang, Changhua Hsien (TW)

(73) Assignee: ALEXANDER YEH INDUSTRY CO., LTD., Changhua Hsien (TW)

( * ) Notice: Subject to any disclaimer, the term of this patent is extended or adjusted under 35 U.S.C. 154(b) by 179 days.

This patent is subject to a terminal disclaimer.

(21) Appl. No.: 14/046,633

(22) Filed: Oct. 4, 2013

(65) Prior Publication Data

US 2015/0097134 A1    Apr. 9, 2015

(51) Int. Cl.
*F16K 31/60* (2006.01)
*E03C 1/04* (2006.01)

(52) U.S. Cl.
CPC ............... *F16K 31/60* (2013.01); *E03C 1/0412* (2013.01)

(58) Field of Classification Search
CPC ............................. F16K 31/60; E03C 1/4012
USPC ............. 137/315.01, 315.12, 315.13, 315.14; 251/213, 231, 292, 293
See application file for complete search history.

(56) References Cited

U.S. PATENT DOCUMENTS

| | | | | |
|---|---|---|---|---|
| 5,671,906 | A * | 9/1997 | Rosen | 251/148 |
| 6,178,981 | B1 * | 1/2001 | Wales | 137/15.18 |
| 7,631,655 | B1 * | 12/2009 | Kopp | 137/15.18 |
| 8,266,767 | B1 * | 9/2012 | Huang | 16/441 |
| 2013/0019708 | A1 * | 1/2013 | Huang | 74/490.12 |
| 2013/0020518 | A1 * | 1/2013 | Huang | 251/213 |
| 2013/0036854 | A1 * | 2/2013 | Huang | 74/543 |
| 2013/0036855 | A1 * | 2/2013 | Huang | 74/543 |
| 2013/0036856 | A1 * | 2/2013 | Huang | 74/543 |
| 2013/0036857 | A1 * | 2/2013 | Huang | 74/543 |
| 2013/0068063 | A1 * | 3/2013 | Huang | 74/543 |

* cited by examiner

*Primary Examiner* — John Fristoe, Jr.
*Assistant Examiner* — Kevin Barss

(57) ABSTRACT

A combined faucet handle and control valve assembly has a faucet handle, a plurality of connecting joints and a control valve. The faucet handle provided with a chamber, with an engaging space formed by a dividing member and a base in the chamber, an assembly aperture disposed in the base and passing through the faucet handle. The assembly aperture is engaged with a corresponding first securing member. Each connecting joint has a rod, an end of the rod provided with a connecting portion having an engaging aperture, the engaging aperture having a shape corresponding to a valve rod of the control valve, another end of the rod provided with a first section and a second section, the first section provided with a through aperture disposed axially through the rod and the connecting portion and engaging with a second securing member, and the second section is provided with a positioning aperture.

5 Claims, 5 Drawing Sheets

COMBINATION OF A FAUCET HANDLE AND A CONTROL VALVE

BACKGROUND OF THE INVENTION

1. Field of the Invention The present invention relates to a combination of a faucet handle and a control valve, and more particularly to a combination of a faucet handle and a control valve with is suitable for different control valves.

2. Description of the Related Art

Currently, different control valves are provided with different styles of valve rod, which require different corresponding faucet handle.

In order to simplify the assembly options, a connecting joint is developed to make the faucet handle to be suitable for different valve rods for different control valves. However, the conventional connecting joints still have different limitations.

Therefore, it is desirable to provide a combination of a faucet handle and a control valve to mitigate and/or obviate the aforementioned problems.

SUMMARY OF THE INVENTION

An objective of the present invention is to provide a combination of a faucet handle and a control valve.

In order to achieve the above-mentioned objective, a combined faucet handle and control valve assembly has a faucet handle, a plurality of connecting joints and a control valve. The faucet handle is provided with a chamber, with an engaging space formed by a dividing member and a base in the chamber, an assembly aperture disposed in the base and passing through the faucet handle, the assembly aperture engaged with a corresponding first securing member. Each connecting joint has a rod, an end of the rod provided with a connecting portion having an engaging aperture, the engaging aperture having a shape corresponding to a valve rod of the control valve, another end of the rod provided with a first section and a second section, the first section provided with a through aperture disposed axially through the rod and the connecting portion and engaging with a second securing member, and the second section is provided with a positioning aperture at a lower portion. The control valve is configured for installation into a wall and includes an outer housing extending and engaged with a sleeve, an ornament panel is sandwiched between the wall and the sleeve, and the valve rod of the control valve is disposed in the sleeve and connected to an inner control member. Each connecting joint utilizes the engaging aperture to engage with the valve rod, and the second securing member is disposed through the through aperture and locked with the valve rod. With the respective rod, each connecting joint extends out from the sleeve and is connected to the faucet handle; and the first section and the second section of each connecting joint engage with the engaging space of the faucet handle and are respectively secured with the positioning aperture and the assembly aperture via the first securing member, such that the faucet handle is assembled with the valve rod via the connecting joints.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
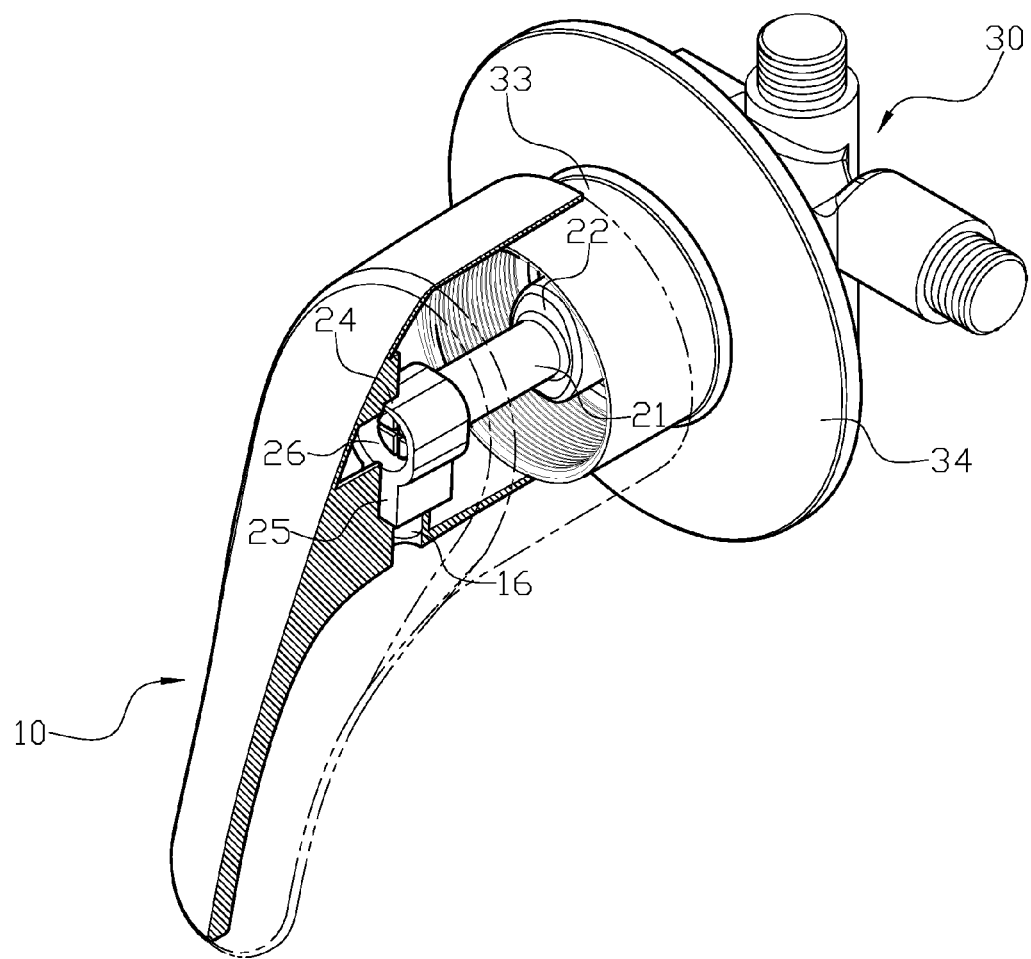
FIG. 1 is a perspective assembly drawing of an embodiment of the present invention.
Figure 2:
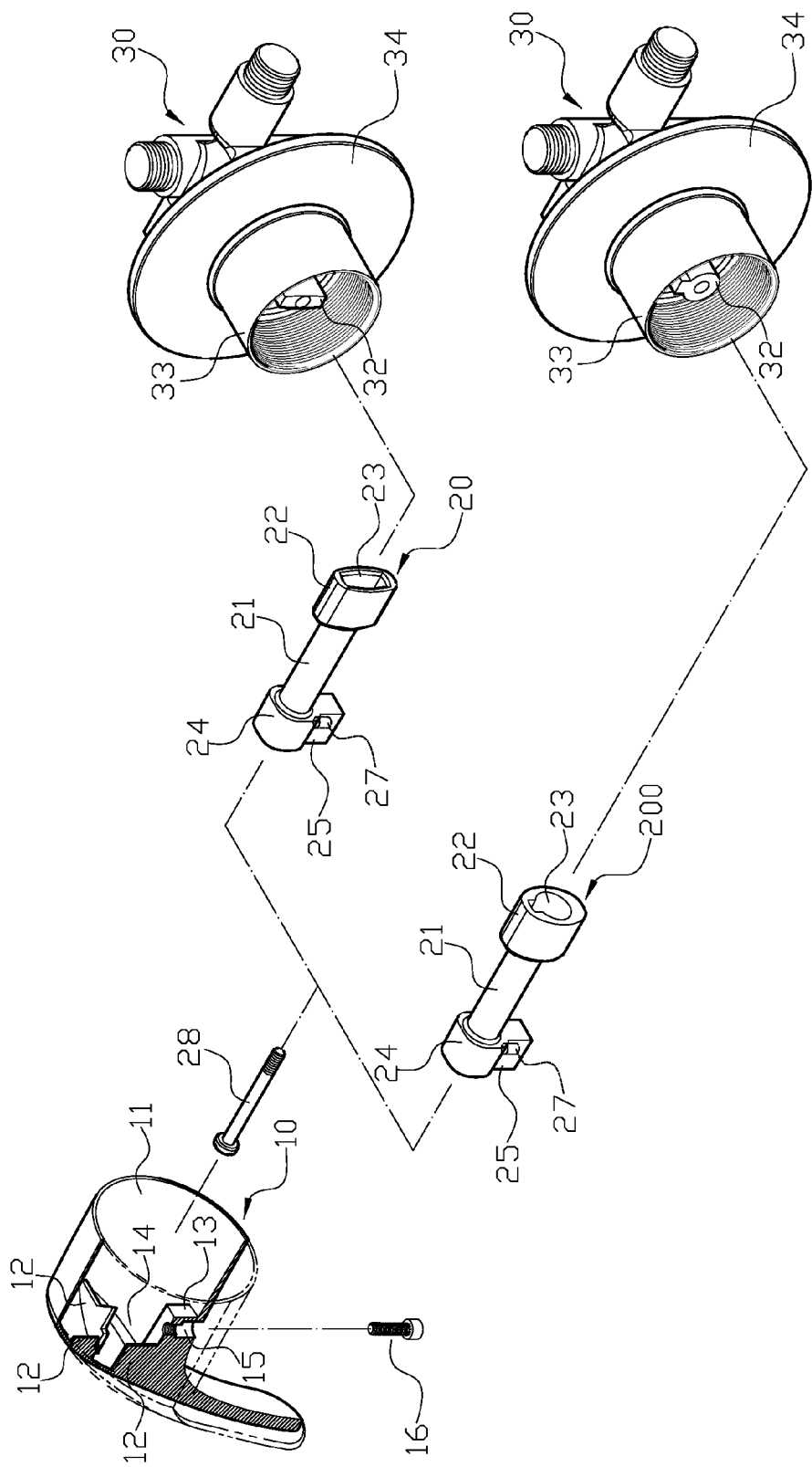
FIG. 2 is a perspective exploded drawing of the embodiment of the present invention.
Figure 3:
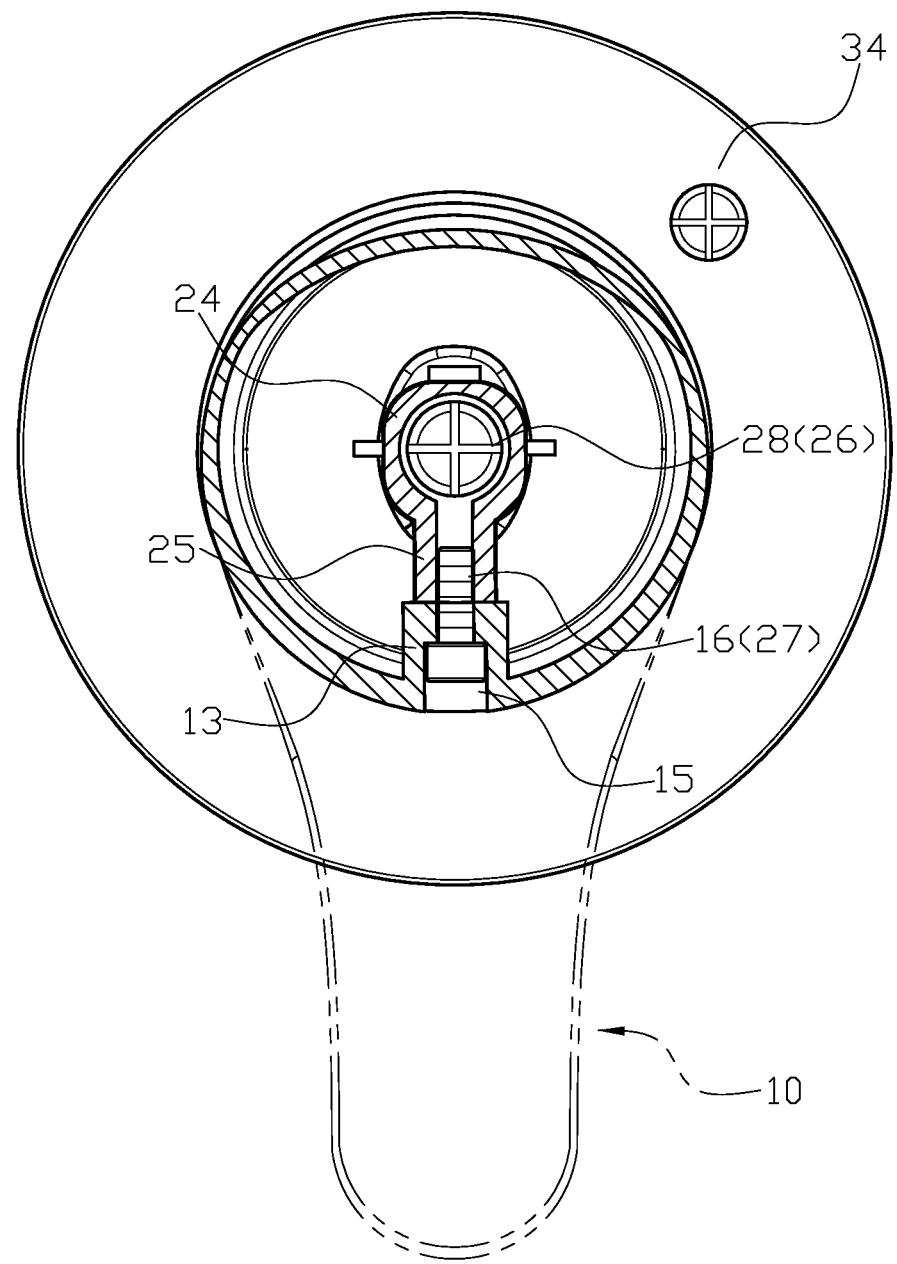
FIG. 3 is an assembly cross-section al drawing of the embodiment of the present invention.

As shown in FIGS. 1-3. A combination of a faucet handle and a control valve comprises: a faucet handle 10, two connecting joints 20, 200 and a control valve 30. The faucet handle 10 is provided with a chamber 11, and a bottom portion of the chamber 11 of the faucet handle 10 includes four evenly separated dividing members 12. A bottom edge of the dividing member 12 is connected to a base 13. The engaging space 14 formed by the dividing member 12 and the base 13 in the faucet handle 10 connected to the chamber 11. An assembly aperture 15 is disposed on the base 13 and through the faucet handle 10, and the assembly aperture 15 is engaged with a corresponding first securing member 16. The connecting joints 20,200 respectively have a rod 21. One end of the rod 21 is provided with a connecting portion 22 having an engaging aperture 23, and the engaging aperture 23 has a shape corresponding to a valve rod 32 of the control valve 30. Furthermore, the engaging aperture 23 and the valve rod 32 respectively have corresponding oval shapes or corresponding tongue and groove shapes. Therefore, the engaging apertures 23 of the connecting joints 20,200 are able to jacket onto the valve rod 32. Another end of the rod 23 is provided with a first section 24 and a second section 25, and the first section 24 and the second section 25 respectively have different dimensions. The first section 24 is provided with a through aperture 26 disposed axially through the rod 21 and the connecting portion 22 and engaged with a second securing member 28, and the second section 25 is provided with a positioning aperture 27 at a lower portion. The control valve 30 is installed into a wall and includes an outer housing 31 extending and engaged with a sleeve 33, and an ornament panel 34 is sandwiched between the wall and the sleeve 33. The valve rod 32 of the control valve 30 is disposed in the sleeve 33 and connected to an inner control member which can control water or temperatures of the water.

Figure 4:
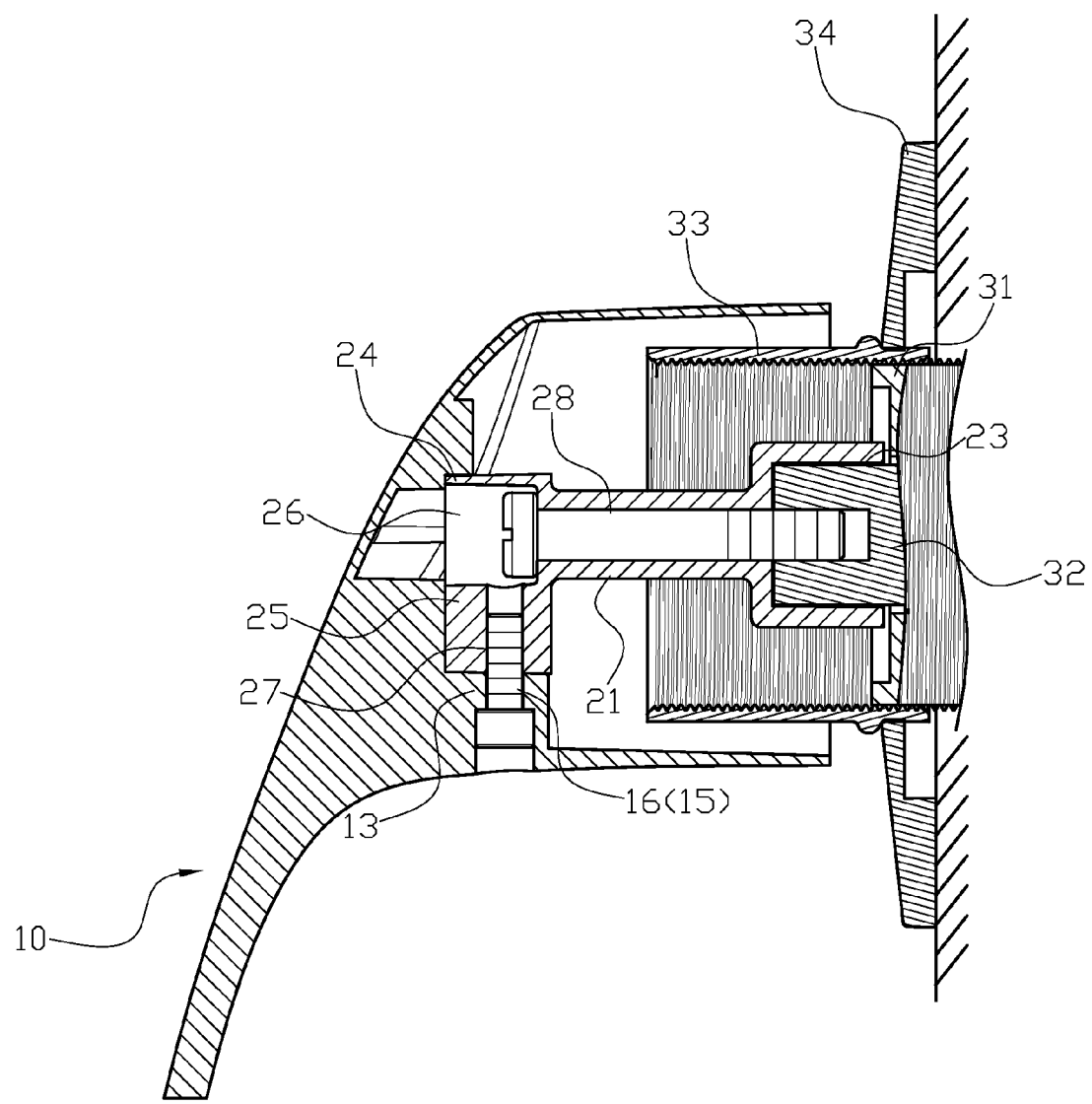
FIG. 4 is a schematic drawing of the embodiment of the present invention.
Figure 5:
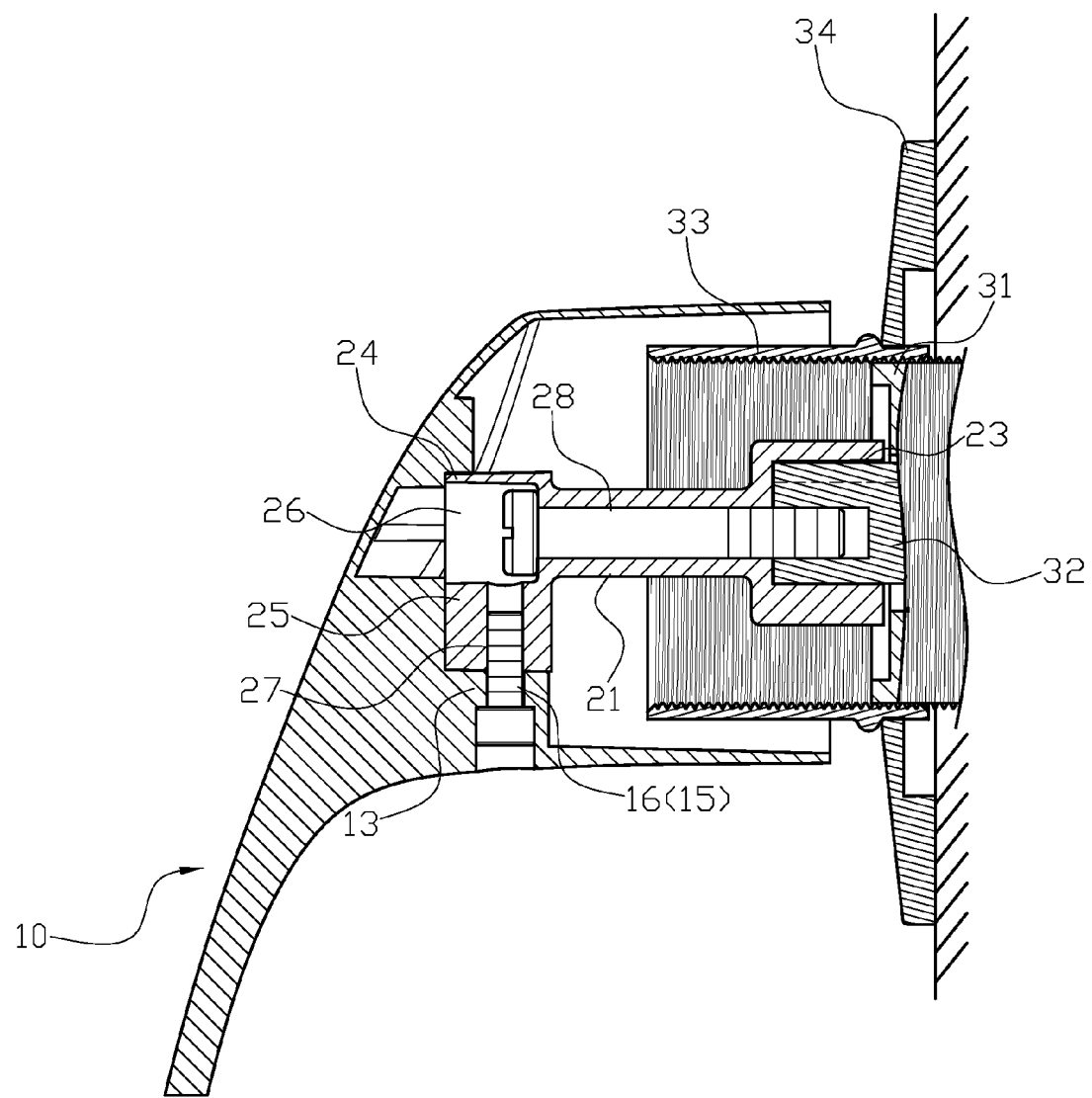
FIG. 5 is a schematic drawing of another embodiment of the present invention.

For actual operation, a user can choose different connecting joints 20, 200 with different engaging aperture 23 to be engaged with the valve rod 32 of the control valve 30, as shown in FIG. 4 and FIG. 5 The engaging aperture 23 is jacketed onto the valve rod 32, the second securing member 28 is disposed through the through aperture 26 and secured onto the valve rod 32. With the rod 21, the connecting joints 20, 200 are able to extend out the sleeve 33 to be connected to the faucet handle 10. Moreover, the connecting joints 20, 200 are respectively engaged with the engaging space 14 of the faucet handle 10, and the first securing member 16 is fixed with the positioning aperture 27 and the assembly aperture 15 together, such that the faucet handle 10 is assembled with the valve rod 32 via the connecting joints 20,200.

With the above mentioned description, the combination of the faucet handle and the control valve has following benefits: with the connecting joints 20, 200, the faucet handle 10 is installed onto the control valve 30 having the sleeve 33 and the ornament panel 34. Since the engaging apertures 23 is provided with different shapes, the faucet handle 10 can be installed onto different valve rod 32 of different control valves 30.

Although the present invention has been explained in relation to its preferred embodiment, it is to be understood that many other possible modifications and variations can be made without departing from the spirit and scope of the invention as hereinafter claimed.

What is claimed is:

1. A combined faucet handle and control valve assembly comprising a faucet handle, a plurality of connecting joints and a control valve, wherein:

the faucet handle is provided with a chamber, with an engaging space formed by a dividing member and a base in the chamber, an assembly aperture disposed in the base and passing through the faucet handle, the assembly aperture is engaged with a corresponding first securing member;

each connecting joint has a rod, an end of the rod provided with a connecting portion having an engaging aperture, the engaging aperture having a shape corresponding to a valve rod of the control valve, another end of the rod provided with a first section and a second section, the first section provided with a through aperture disposed axially through the rod and the connecting portion and engaging with a second securing member, and the second section is provided with a positioning aperture at a lower portion;

the control valve is configured for installation into a wall and includes an outer housing extending and engaged with a sleeve, an ornament panel is sandwiched between the wall and the sleeve, and the valve rod of the control valve is disposed in the sleeve and connected to an inner control member;

each connecting joint utilizes the engaging aperture to engage with the valve rod, and the second securing member is disposed through the through aperture and locked with the valve rod;

with the respective rod, each connecting joint extends out from the sleeve and is connected to the faucet handle; and the first section and the second section of each connecting joint engage with the engaging space of the faucet handle and are respectively secured with the positioning aperture and the assembly aperture via the first securing member, such that the faucet handle is assembled with the valve rod via the connecting joints.

2. The combined faucet handle and control valve assembly as claimed in claim 1, wherein a bottom portion of the chamber of the faucet handle includes four evenly separated dividing members, a bottom edge of each dividing member is connected to a respective base, and the engaging space formed by the dividing members and the base in the faucet handle is connected to the chamber.

3. The combined faucet handle and control valve assembly as claimed in claim 1, wherein the engaging aperture and the valve rod respectively have corresponding oval shapes.

4. The combined faucet handle and control valve assembly as claimed in claim 1, wherein the engaging aperture and the valve rod respectively have corresponding tongue and groove shapes.

5. The combined faucet handle and control valve assembly as claimed in claim 1, wherein the first section and the second section of each connecting joint have different respective dimensions.

* * * * *